(12) United States Patent
Bourgeois

(10) Patent No.: US 6,584,672 B1
(45) Date of Patent: Jul. 1, 2003

(54) METHOD FOR THE MANUFACTURE OF BUNDLES OF METAL SHEETS OF ANNULAR SHAPE

(75) Inventor: Raymond Bourgeois, Roulans (FR)

(73) Assignee: R. Bourgeois, Besancon (FR)

( * ) Notice: Subject to any disclaimer, the term of this patent is extended or adjusted under 35 U.S.C. 154(b) by 17 days.

(21) Appl. No.: 09/708,759

(22) Filed: Nov. 8, 2000

(30) Foreign Application Priority Data

Nov. 10, 1999 (FR) .............................................. 99 14173

(51) Int. Cl.⁷ .............................................. H02K 15/02
(52) U.S. Cl. ............................ 29/596; 310/214; 310/42
(58) Field of Search ........................ 29/596, 598, 607, 29/732; 310/214, 42, 216

(56) References Cited

U.S. PATENT DOCUMENTS

| 4,102,040 A | 7/1978 | Rich |
| 4,116,033 A | 9/1978 | Iwaki et al. |
| 4,198,743 A | 4/1980 | Stuber |
| 4,597,172 A | 7/1986 | Bourgeois |
| 5,592,731 A | * 1/1997 | Huang et al. .................. 29/596 |
| 6,281,612 B1 | * 8/2001 | Asao et al. .................... 29/596 |
| 6,317,962 B1 | * 11/2001 | Adachi et al. ................. 29/596 |

FOREIGN PATENT DOCUMENTS

FR          2171398 A          9/1973

* cited by examiner

Primary Examiner—Gregory Vidovich
Assistant Examiner—Stephen Kenny
(74) Attorney, Agent, or Firm—Bugnion S.A.; John Moetteli

(57) ABSTRACT

The method makes it possible to form a stator of an electric motor by means of a multiple-slide press (21, 22, 23). The starting point is a bundle consisting of rectilinear segments of sheets obtained by stamping and welded. The stator is formed by means of four successive operations carried out by four groups of slides of a multiple-slide press and corresponding dies. The cylinder formed is subsequently welded along its joining generatrix and is calibrated in a hydraulic press.

3 Claims, 5 Drawing Sheets

METHOD FOR THE MANUFACTURE OF BUNDLES OF METAL SHEETS OF ANNULAR SHAPE

FIELD OF THE INVENTION

The present invention relates to a method for the manufacture of bundles of metal sheets of annular shape for stators of electric machines from stamped sheets according to the following steps: rectilinear sheet segments are cut out by stamping, with a length equal to the length of the periphery of the annular bundle to be formed, each segment taking the shape of a band, the teeth of which have the shape of the radial cross section of the pole pieces of the stator and the side opposite the teeth has notches arranged in the extension of the teeth, the segments are stacked to form a bundle of predetermined height, and they are assembled by means of at least two laser-welding or plasma-welding beads in two grooves formed by the notches. The invention also relates to a plant for carrying out the method.

PRIOR ART

It is known, for constructing stators of small and medium electric machines and, in particular, of alternators of motor vehicles, to form bundles of rings cut out by stamping in magnetic sheets or the like and to assemble them by riveting or welding.

The cut-out rings have, toward the inside, open slots formed by arms which are directed radially inward and which in the bundle will form the pole pieces of the stator. Cutting out an entire ring by stamping has some disadvantages: there is a large amount of waste, since that part of the sheet which corresponds to the inside diameter of the ring can be used only for forming a ring of smaller diameter, and indeed only insofar as the thickness of the sheet and the diameter correspond to the technical characteristics required. On the other hand, there is also a large amount of sheet waste corresponding to that part of the sheet which is outside the diameter of the ring.

The construction of the rings does not make it possible to maintain the required shape tolerances and the exact dimensions both of the rings and of the ring bundles on account of the internal stresses which are generated during stamping and which cannot easily be eliminated because of the closed shape of the ring. The internal stresses have an influence on the size tolerances of the inside and outside diameters of the rings and on the parallelism of two faces of a sheet bundle. It is often necessary to carry out additional machining of the stator before the required tolerances can be adhered to.

The Applicant's U.S. Pat. No. 4,597,172, the content of which is incorporated by reference, proposed a method and a plant for the manufacture of bundles of metal sheets from ring segments, in particular ring segments at 120°, without this being a limiting value.

This method and apparatus are satisfactory and make it possible, on the one hand, to make savings with regard to the sheet waste, since only ring segments are cut out and, on the other hand, to adhere more closely to the geometry of the bundle in that the internal stresses generated during the stamping of a closed ring are eliminated.

U.S. Pat. No. 4,102,040, the content of which is incorporated by reference, proposes a manufacturing method which, according to one variant, involves bending the sheet bundle formed by causing it to mate with the lateral surface of a drum in a continuous operation. When the two ends of the bundle meet, they are held by means of a connecting device and welding is then carried out.

U.S. Pat. No. 4,198,743, the content of which is incorporated by reference, describes a method which, according to one variant, makes it possible to form a C-shaped magnetic core by the middle of a sheet bundle being immobilized and by two simultaneously gripping tools being employed to exert, from the center, continuous forces making it possible to obtain the C-shape.

SUMMARY OF THE INVENTION

The object of the present invention is to propose a new method for the manufacture of bundles of metal sheets for the stators of electric machines, making it possible, in particular, to reduce considerably the waste attributable to this manufacture and to simplify the implementing plant.

The method according to the present invention is defined by a combination of the following steps:

The bundle is held gripped between a flat surface bearing on the bundle surface having the grooves, over approximately half the length of the segment, leaving approximately one quarter of the total length free at each end, and means bearing on the face having the pole pieces, the two ends are prebent by means of a multiple-slide press over approximately half their free parts, so as to form, on each of them, an arc of approximately 40°, by pressure being applied to their corresponding grooved surfaces, against punches of corresponding shape, the two free ends are bent by means of a multiple-slide press over the entirety of their free parts in a 90° arc of a circle, by pressure being applied to the grooved surface of the two ends, against punches of corresponding shape, the bundle is released and is held solely along two edges, one on the inner face and the other on the outer face of the bundle, corresponding to the midpoints of the segments, pressure is applied to the arcuate parts of the bundle until the cylinder is closed, the joined ends are laser-welded or plasma-welded, thus forming a cylindrical component.

The advantages of the method according to the invention are that the formation of the ring is carried out sequentially, thus allowing better cylindricity due to the fact that the fibers of the metal expand between two steps. On the other hand, the machine used is a multiple-slide machine which has existed for a long time. It is necessary to adapt the machine to implement the method with the result being that there is virtually no need for correction of cylindricity after the welding of the ends of the folded bundle.

According to a preferred variant of the invention, two segments are cut out from a sheet metal band, which are back to back and are offset at a distance equal to half the distance between two pole pieces, thus making it possible to limit sheet waste to a minimum, virtually to those parts of the sheet which correspond to the spaces between the poles.

On the other hand, there is no stress during stamping, since the pieces are cut out in straight segments, thus avoiding the problems which they may present with regard to the geometry of the stator.

In order to adhere to the geometry of the stator, the sheet bundles, after being finally assembled, may be subjected to calibration by means of a hydraulic press in the case of strict tolerances.

A plant for implementing the method according to the invention is also proposed.

The implementing plant is defined in that it comprises a sheet metal stamping station for the formation of rectilinear segments, a station for stacking and deforming the bundles with a predetermined height, a station for assembling by the affixation of at least two welding beads, and a station for folding the bundles on a multiple-slide press to form cylindrical components, said folding station likewise being provided with a station for welding the joined ends of each bundle, the folding station comprising a first plate provided with a bearing surface perpendicular to said plate, for receiving each of the bundles, and with three slides, one which of is located on the side having the teeth and is provided with a stop piece for holding the bundle against said bearing surface and two punches and two slides are located on the opposite side, each provided with a die for bearing on the ends of the bundle and for prebending them over approximately 40° against the punches of the first slide, with a second plate parallel to the first and having three slides arranged in the same way as those of the first plate, the two slides acting on the outer surface of the bundle having dies with a surface concave over approximately a quarter of a cylinder, in order to push the prebent ends of the bundle against corresponding punches of the opposite slide into an arc of a circle of 90°, with a third plate provided with a bearing surface for receiving the still planar part of the previously bent bundle, with a slide provided with a stop surface for holding this bundle against said flat surface and two slides facing one another on either side of the 90°-bent parts of the bundle and provided with dies having a concave cylindrical surface intended for pushing the arcuate ends of the bundle up to complete closure and the formation of a cylinder, and with a fourth plate provided with a bearing surface, on which the bundle rests with its generatrix opposite the generatrix along which the two ends of the bundle are joined, with a first slide provided with a member making it possible to hold the bundle against said bearing surface and with four slides uniformly distributed along a circumference and provided with four dies with concave surfaces having the dimensions and the radius of approximately a quarter of a cylinder, making it possible to keep the ring thus formed closed, and with a laser-welding or plasma-welding device for welding the joined ends of the bundle along a generatrix.

BRIEF DESCRIPTION OF THE DRAWINGS

The method according to the invention will be described with the aid of the accompanying drawings.

DESCRIPTION OF THE PREFERRED EMBODIMENTS

Rectilinear sheet segments 1 are cut out by known means by stamping from sheet metal bands and have a form of a band provided with teeth 2, the shape of which is that of the pole pieces of the stator of an electric machine. The back of the rectilinear segment has notches 3 arranged in the extension of the teeth 2.

These sheet segments may be cut out either from a band representing a width equal to approximately the width of the band or from a band which has double this width, the cut-out bands being back to back and having an offset corresponding to half the space between two teeth, thus limiting the waste.

Figure 3:
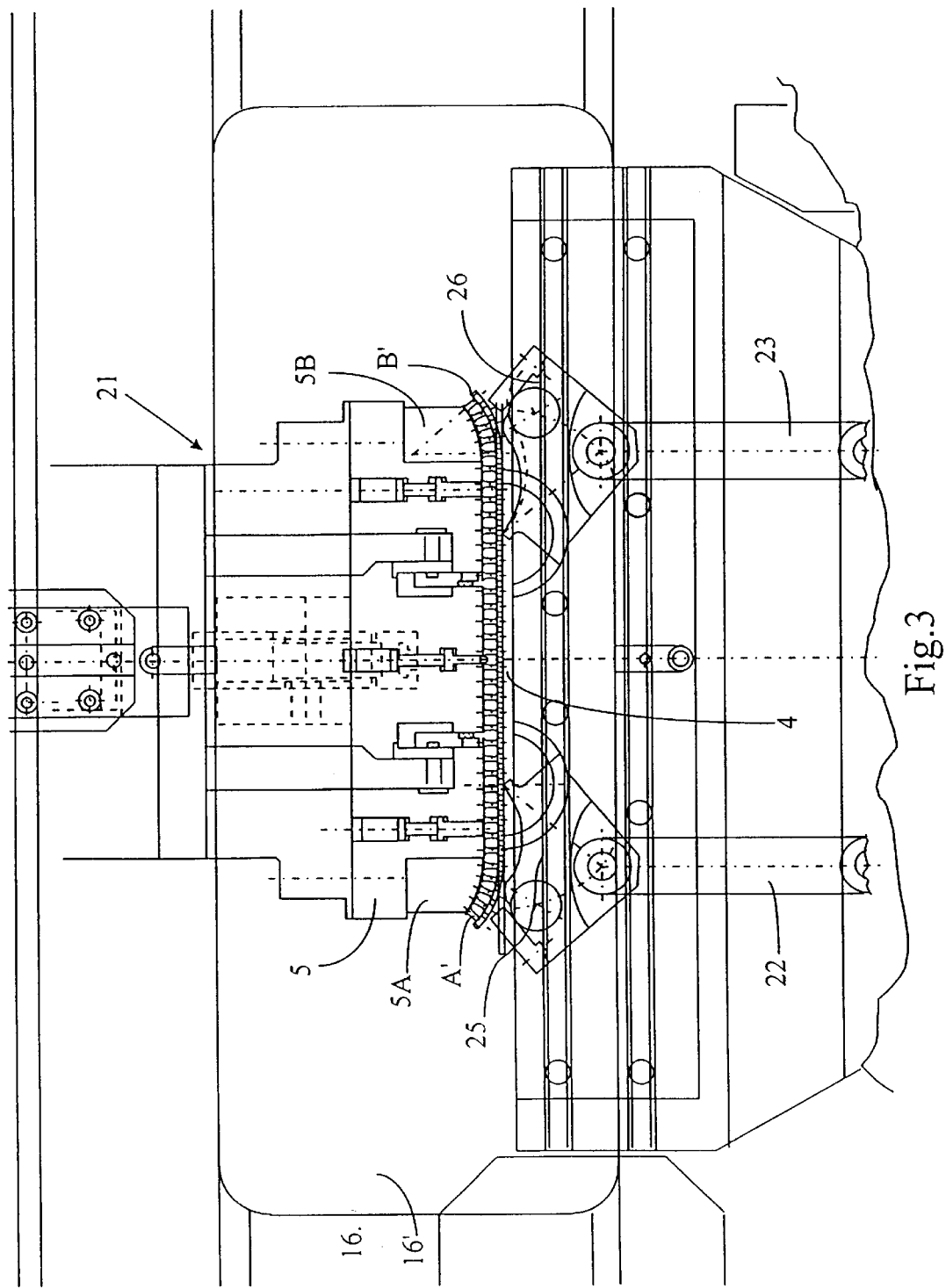
FIGS. 3 to 6 are front views of the parts of the station for folding in four steps.
Figure 5:
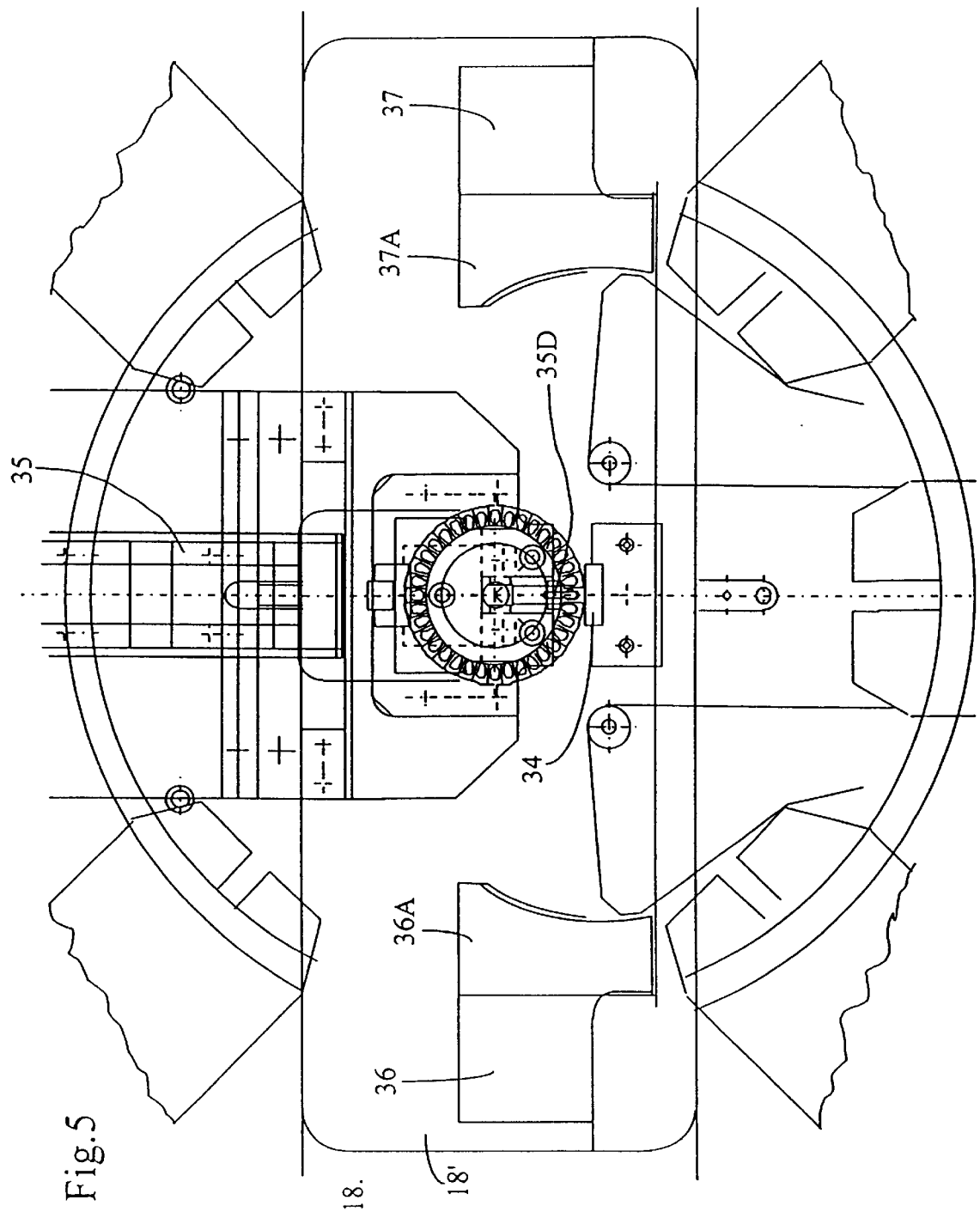
Figure 6:
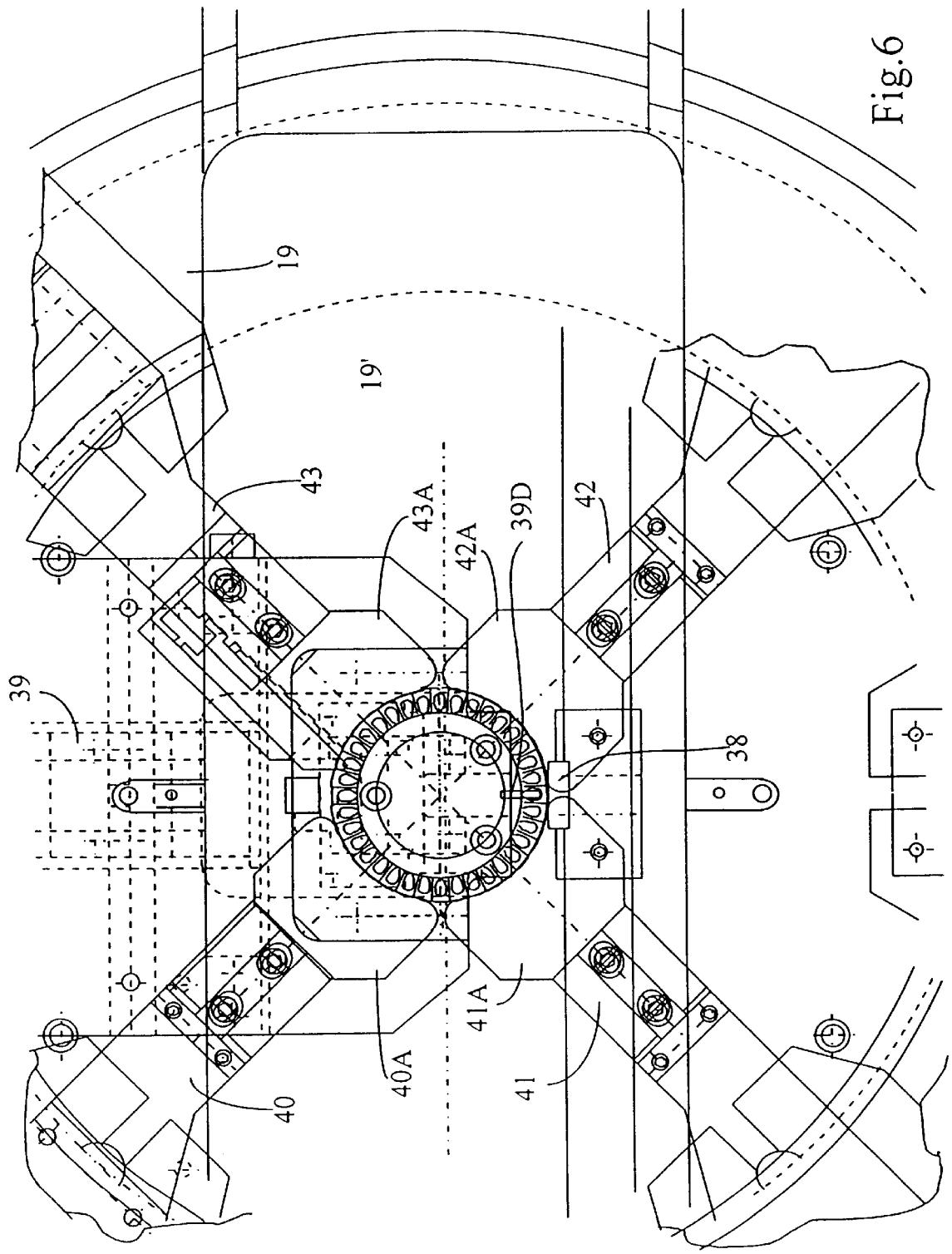

After a bundle being obtained by stacking, the height of which corresponds to the length of the stator, the segments are welded by means of at least two welding beads which are preferably located in notches 3, the bundle is arranged on a multiple-slide machine in order to carry out the formation of the annular stator. For this purpose, the bundle together with the segments 1 is placed with a central part, on the side where the notches 3 are located and which is intended for forming the outer surface of the stator, onto a bearing surface 4 (FIG. 3), while the bundle is held on the inside, for example, by means of a stay 5. Action is taken on the two free ends of the bundle, which each represent approximately one eighth of the length of the bundle, and the ends of the bundle are bent into the position A', B' against punches of corresponding shape, thus forming two arcs of approximately 40°. Subsequently (FIG. 4), the ends are bent over the free length (that is to say, one quarter of the length of the bundle) in order to form an arc A, B of approximately 90° against other punches. Thereafter, the bundle is held with two opposite edges (FIGS. 5 and 6), and action is taken on the ends of the bundle in order to obtain the complete closure of the ring. When the closure of the ring is obtained, a laser-welding or plasma-welding bead is applied to the ends, thus ensuring the closing of the ring, and the stator is thereby formed.

Finally, the stator is placed into a hydraulic calibrating press in order to make it possible to ensure the geometry of the final stator.

The notches 3 located on the outer surface of the segments make it possible to obtain the formation of the ring more easily than if the outer surface were continuous.

Figure 1:
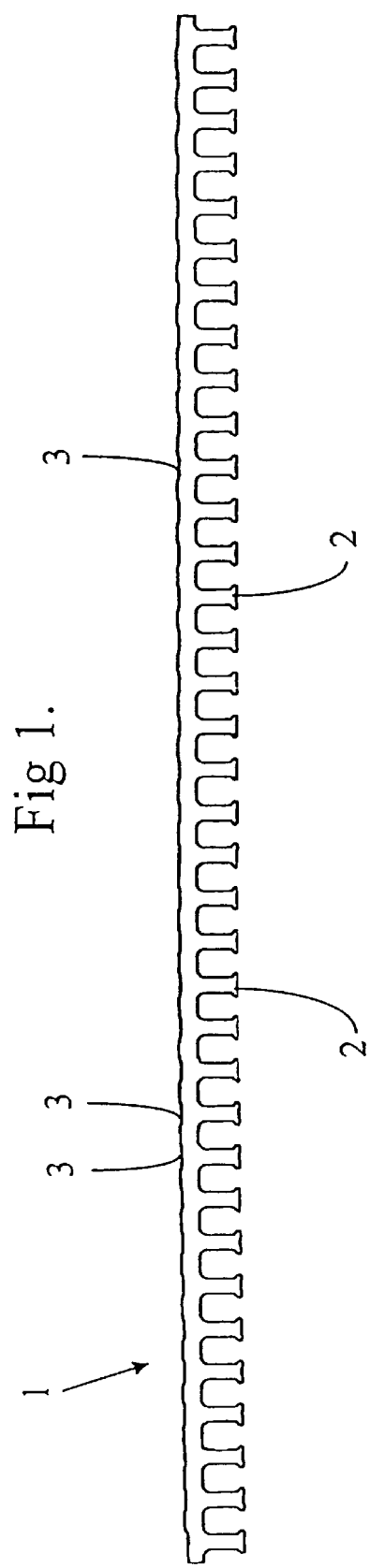
FIG. 1 shows a plan view of a bundle of metal sheets before folding.
Figure 2:
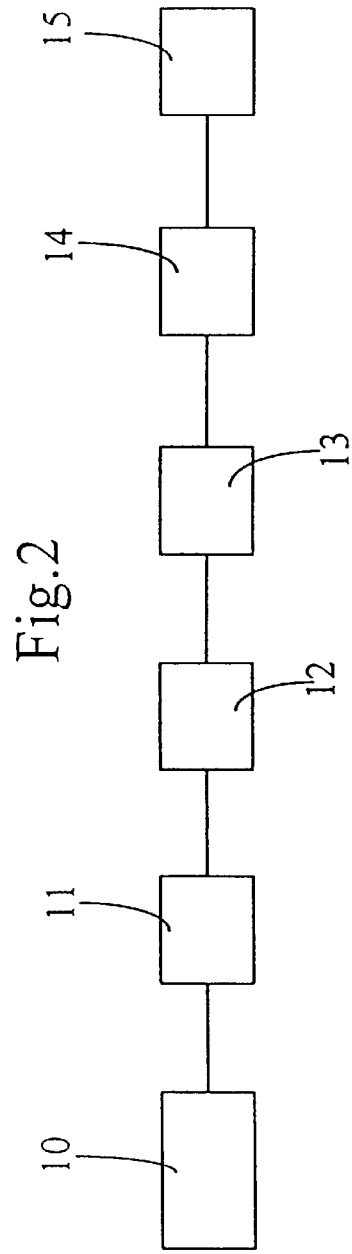
FIG. 2 is a diagrammatic view of the complete plant for implementing the method.

Referring to FIG. 2, the main stations of a plant for implementing the method have been shown diagrammatically. A first stamping station 10 makes it possible, from a metal sheet, to cut out segments having a shape such as that shown in FIG. 1. This is then followed by a stacking station 11 for forming the bundles with a predetermined height. This is then followed by a welding station 12 making it possible to affix at least two welding beads in order to hold the elements of each bundle relative to one another, and finally this is followed by a station 13 which forms the stator. This station 13 will be described explicitly with reference to FIGS. 3 to 6. Upon the exit of the stator formed at the station 13, the bundles enter a calibrating press 14, in order to ensure the exact inner and outer geometry of the bundle, and the bundles finally arrive at a packaging station 15.

These various stations have been designated briefly, but, of course, each comprises devices making it possible also to carry out some other operations, for example the stacking station 11 may be combined with a weighing station which makes it possible to check, by weight, whether the stator comprises the specified weight of metal and, if appropriate, to add segments in order to complete it. There may also be provision, after welding, for cooling the bundles before passing on to the next step. However, this type of plant is not the subject of the present invention which is concerned, above all, with the implementation by means of multiple slides of the method which relates more specifically to the folding of the bundles in order to form a stator, as will be described with reference to FIGS. 3 to 6.

For folding, a bundle of assembled sheets is placed on its face opposite that of the pole pieces, and the bundle is passed in successive steps through a multiple-slide press. In principle, this folding and the final closing of the stator take place in four successive steps, the bundle being displaced each time parallel to one direction and more specifically perpendicularly to plates (in principle, arranged vertically) which support slides. The machine comprises four plates 16, 17, 18 and 19 (FIGS. 3, 4, 5, 6) which are arranged one behind the other and are each provided with a rectangular central hole 16', 17', 18', 19' which makes it possible to pass the bundles from one plate to the other.

The first plate 16 comprises a bearing surface 4, on which the bundle will rest, and three slides 21, 22, 23, the slide 21 located on the opposite side with respect to the bearing surface is provided with a stop surface 5, by means of which the bundle is held on the bearing surface 4, at the same time leaving approximately at least a quarter of the length of each bundle on either side. The two slides 22 and 23 are located on the opposite side and are each provided with a die 25, 26 having a surface which has approximately an S-shaped cross section and which will slide and come to bear on the free ends of the bundle, in order to exert pressure and form an arc of approximately 40° at each of the two ends by pressing said ends against punches 5A, 5B.

The bundle will subsequently pass through this plate 16 via the hole 16' in order to arrive at the plate 17 illustrated in FIG. 4, which is likewise provided with a bearing surface 27 and three slides 28, 29 and 30 arranged virtually in the same way as the slides of the plate 16. The slide 28 is likewise provided with a stop surface 31, by means of which the partially bent bundle is held against the bearing surface 27.

If the length of the bands closing the bundles is relatively large, two slides may be employed in order to hold the bundles against the bearing surfaces involved in the previous two steps.

Figure 4:
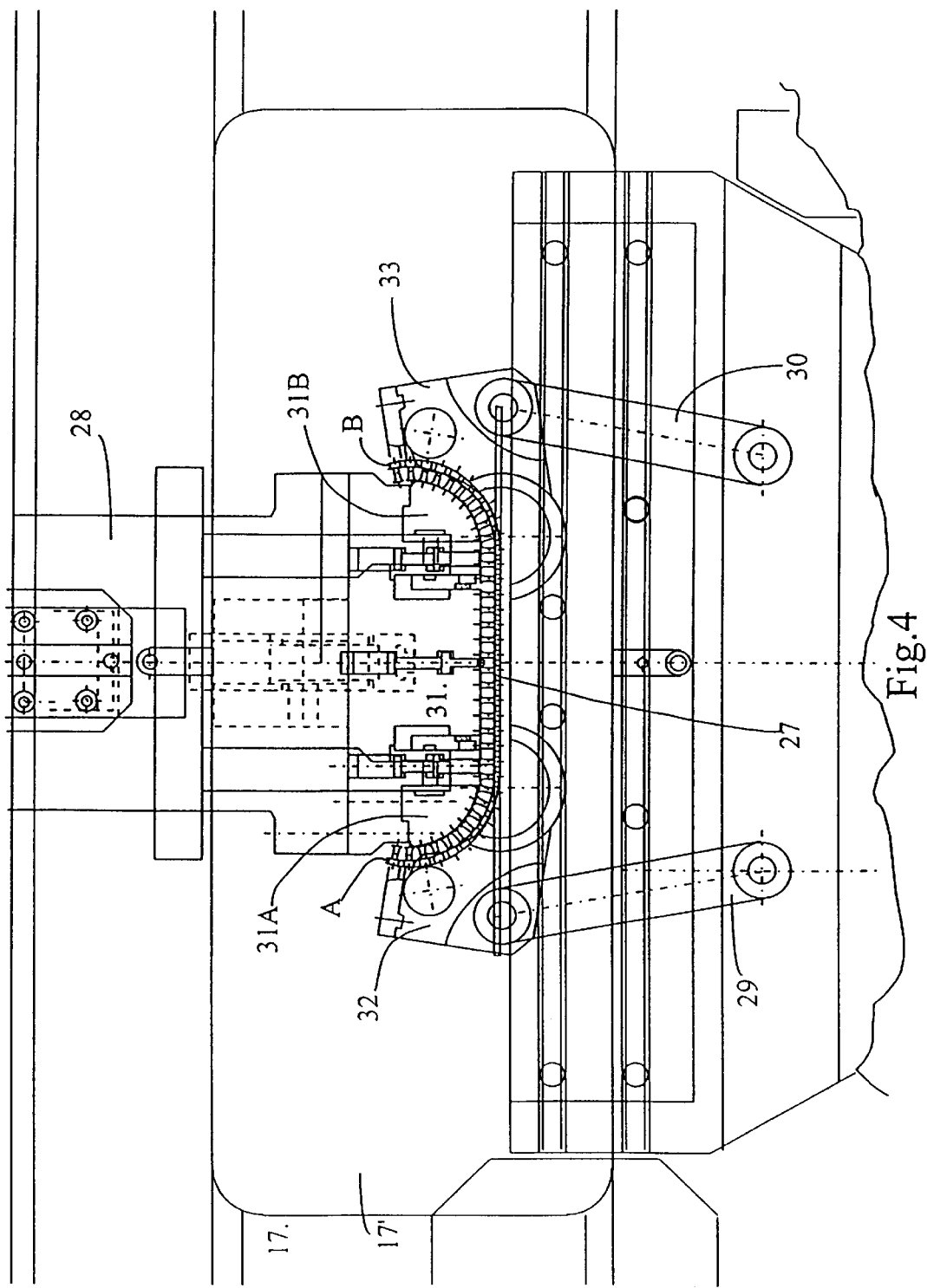

The two slides 29 and 30 likewise comprise, at their ends, two concave dies 32 and 33 which are articulated at one end on the slide and by means of which said slides come to bear on the prebent ends of the bundle and deform them until approximately an arc of 90° is formed, as illustrated in FIG. 4, by pressing on corresponding punches 31A, 31B.

Subsequently, passing through the hole 17', the bundle will approach the plate 18 which is likewise provided with a bearing surface 34 and three slides 35, 36 and 37. The slide 35 is provided this time with a bearing surface which is a finger 35D coming to bear between two polar teeth in order grip the bundle against the bearing surface 34. The two lateral slides 36 and 37 are likewise each provided with a concave die 36A, 37A for pushing the bent ends of the bundle until the bundle forms a cylinder.

After the bundle has been formed in this way, it passes toward the plate 19 through the hole 19' and comes to bear on a bearing surface 38. A slide 39 similar to the slide 35 holds the cylinder against the bearing surface 38 by means of a finger 39D, while four slides 40, 41, 42 and 43, uniformly distributed on the surface of the plate 19 and each provided with a concave die 40A, 41A, 42A, 43A, the shape of which corresponds approximately to a quarter of a cylinder, grip the bundle in order to keep it closed in its final position, while a laser-welding or plasma-welding machine, not illustrated, applies a welding bead to the joined ends of the bundle. From this moment, the bundle leaves through the hole 18' in order to enter a calibrating press for ensuring its geometry, before undergoing cooling in order to eliminate the stresses attributable to the welding bead.

The use of slides for deforming a sheet bundle and for forming a stator has the advantage that the machine can easily be adapted to the different dimensions of the desired production. In the first two plates 16 and 17, the slide supports are each held in two linear and parallel guides, while, on the plates 18 and 19, the guides are two concentric circles which make it possible to modify the position of the slide supports as a function of the requirements and the dimensions of the stator to be formed.

It is clear that the plates 16 and 17 may be separate boards or the two faces of the same board, since, on one board 16,
the slides 21, 22, 23 can very easily be arranged on one side and the slides 28, 29 and 30 on the other, and, likewise, on the plates 18 and 19 there may be either separate boards or the two faces of the same board. In the same way, the bearing surfaces 4, 27, 34, 38 may be in one piece which passes through these plates, of which the transverse cross section over the entire length of advance decreases, since, during the first two steps, the bundle rests on wide surfaces, while, at the end, it is to rest virtually on a generatrix.

What is claimed:

1. A method for the manufacture of bundles of metal sheets of annular shape for the stator of electric machines from stamped sheets according to the following steps:

cutting out rectilinear sheet segments by stamping, with a length equal to the length of the periphery of the annular bundle to be formed, each segment taking the shape of a band having teeth which have the shape of the radial cross section of the pole pieces of the stator and the side opposite the teeth having notches arranged in the extension of the teeth, stacking the segments to form a bundle of predetermined height and assembling the segments by means of at least two laser-welding or plasma-welding beads in two grooves formed by the notches, defined by the combination of the following steps:

holding the bundle gripped between a flat surface bearing on the bundle surface having the grooves, over approximately half the length of the segment, leaving free a free portion approximately one quarter of the total length at each end, and means bearing on the face having the pole pieces, prebending the two ends by means of a multiple-slide press over approximately half of their free portions, so as to form, on each of them, an arc of approximately 40°, by pressure being applied to their corresponding grooved surfaces, against punches of corresponding shape, the two free ends being bent over the entirety of their free portions in the form of an arc of a circle of 90°, by pressure being applied to their corresponding grooved surfaces, against punches of corresponding shape, bending the two free ends over the entirety of their free portions in a 90° arc of a circle, by pressure being applied to the grooved surface of the two ends against punches of corresponding shape, releasing the bundle and holding solely along two edges, one on the inner face and the other on the outer face of the bundle, corresponding to the midpoints of the segments, applying pressure by means of a multiple-slide press to the arcuate parts of the bundle until the cylinder is closed, and laser-welding or plasma-welding the joined ends, thus forming a cylindrical component.

2. The method as claimed in claim 1, wherein the segments are cut out from sheet metal coils of a width equal to approximately twice the width of two segments to be cut, stamping being carried out so as to obtain two segments back to back, offset at a distance equal to half the distance between two pole pieces.

3. The method as claimed in one of claims 1 and 2, wherein the bundle is subjected to calibration on a hydraulic press in order to shape it to the desired geometric characteristics.

* * * * *